US011383563B2

(12) United States Patent
Malard et al.

(10) Patent No.: US 11,383,563 B2
(45) Date of Patent: Jul. 12, 2022

(54) METHOD FOR CONTROLLING AN ACTIVATION OF A FUNCTION BY A CONTROL MODULE OF A WHEEL UNIT

(71) Applicant: Continental Automotive GmbH, Hannover (DE)

(72) Inventors: Aurélien Malard, Toulouse (FR); Vincent Létard, Toulouse (FR); Jean-Charles Huard, Toulouse (FR)

(73) Assignee: Continental Automotive GmbH

( * ) Notice: Subject to any disclaimer, the term of this patent is extended or adjusted under 35 U.S.C. 154(b) by 0 days.

(21) Appl. No.: 17/441,486

(22) PCT Filed: Mar. 26, 2020

(86) PCT No.: PCT/EP2020/058589
§ 371 (c)(1),
(2) Date: Sep. 21, 2021

(87) PCT Pub. No.: WO2020/193716
PCT Pub. Date: Oct. 1, 2020

(65) Prior Publication Data
US 2022/0144023 A1    May 12, 2022

(30) Foreign Application Priority Data
Mar. 27, 2019 (FR) ...................................... 1903178

(51) Int. Cl.
*B60C 23/04* (2006.01)
(52) U.S. Cl.
CPC ...... *B60C 23/0457* (2013.01); *B60C 23/0442* (2013.01); *B60C 23/0461* (2013.01); *B60C 23/0474* (2013.01)
(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

| 10,206,231 | B1 | 2/2019 | Kandler et al. |
| 2012/0319832 | A1 | 12/2012 | Vassiieff |
| 2020/0374606 | A1* | 11/2020 | Boisset .................... H04Q 9/00 |

FOREIGN PATENT DOCUMENTS

| FR | 2958065 A1 | 9/2011 | |
| JP | 2002536235 A * | 10/2002 | ......... B60C 23/0433 |

(Continued)

OTHER PUBLICATIONS

English Translation of the Written Opinion for International Application No. PCT/EP2020/058589, dated Jun. 9, 2020, 6 pages.

(Continued)

*Primary Examiner* — Andre J Allen
(74) *Attorney, Agent, or Firm* — RatnerPrestia (57) ABSTRACT

A method for controlling a trigger of an activation of a function by a control module housed in a wheel unit and communicating, via a communication module, which includes a first clock employing a crystal oscillator and which communicates via UHF radio waves, with outside the wheel unit, requests to activate a function to be performed at a predetermined time being transmitted to the control module. When an activation is required, a first count of time to activation is started in the communication module by the first clock, a request to activate being transmitted from the communication module to the control module which, upon receipt, is reconfigured in order to activate the function at the predetermined time, an end of the count in the communication module being transmitted to the control module, in order for the trigger to occur at the predetermined time.

12 Claims, 3 Drawing Sheets

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 23/0471; B60C 11/0318; B60C 23/0459; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06

USPC .................................................. 73/146–146.8

See application file for complete search history.

(56) References Cited

FOREIGN PATENT DOCUMENTS

| WO | WO-2017078040 A1 | * | 5/2017 | ......... B60C 23/0418 |
| WO | WO-2019049682 A1 | * | 3/2019 | ............ B60C 23/02 |

OTHER PUBLICATIONS

International Search Report and Written Opinion for International Application No. PCT/EP2020/056589, dated Jun. 9, 2020, with partial English translation, 7 pages.

(56) References Cited

OTHER PUBLICATIONS

International Search Report and Written Opinion for International Application No. PCT/EP2020/058589, dated Jun. 9, 2020, 11 pages (French).

* cited by examiner

METHOD FOR CONTROLLING AN ACTIVATION OF A FUNCTION BY A CONTROL MODULE OF A WHEEL UNIT

CROSS REFERENCE TO RELATED APPLICATIONS

This application is the U.S. National Phase Application of PCT International Application No. PCT/EP2020/058589, filed Mar. 26, 2020, which claims priority to French Patent Application No. 1903178, filed Mar. 27, 2019, the contents of such applications being incorporated by reference herein.

FIELD OF THE INVENTION

The invention relates to a method for controlling an activation of a function via a control module housed in a wheel unit under the guidance of a communication module that employs ultra-high-frequency waves.

BACKGROUND OF THE INVENTION

Nowadays, it is known to mount, in each wheel of a motor vehicle, a wheel unit allowing certain parameters of said wheel to be monitored. Such a wheel unit is commonly referred to as a TPMS module (TPMS standing for tire pressure monitoring system).

Such a wheel unit, the data of which are transmitted to a computer located on-board the vehicle acting as central monitoring and/or control unit, allows, for example, the pressure of the tire and its temperature to be measured.

A control module, integrated into the wheel unit and equipped with a microprocessor, gathers the measured values, for example most frequently values of the pressure of the tire of the wheel associated with the wheel unit, stores them and transmits them regularly and periodically to the central monitoring and/or control unit, which is located remotely from the wheel unit.

In the prior art, again taking the pressure of a tire by way of example of measured value, this not being the sole function that a wheel unit is able to activate, this was done via radio-frequency transmission and reception between the wheel unit and the central monitoring and/or control unit, with a view to comparative analysis of the tire pressures delivered by all the wheel units.

In order to correlate without error the stored pressure measurements and the identification of the corresponding tires, this also being referred to as locating the wheel unit, it was necessary to precisely time the transmissions. Specifically, it was necessary to precisely time acquisitions of physical data such as acceleration value because it allowed a set angular position in the wheel to be detected. Specifically, the transmission of signals in a way synchronized with respect to wheel angle forms the basis of the locating function.

The transmission of signals to the central unit, which was carried out by a transmitting circuit of the control module at a precisely defined frequency, was therefore timed by a precise clock, generally a clock employing a crystal oscillator, present in the control module integrated into the wheel unit. The presence of the crystal oscillator allowed the clock to be calibrated and clock-error compensation to be carried out with a view to increasing the precision thereof.

The presence of the crystal oscillator also allowed other less precise clocks generated by components internal to the chip (RC oscillator), i.e. based on passive components, to be calibrated and a compensation of errors thereof to be performed with a view to increasing their precision.

This external crystal-oscillator-employing element was therefore used both to transmit a radio-frequency signal with a very precise carrier and to perform a comparison of its own clock frequency with those of less precise internal clocks, in order to measure the error thereof and subsequently to be able to perform compensation.

The current trend, however, is to replace the radio-frequency communication between a wheel unit and a monitoring and/or control device located remotely from the wheel unit with communication via short-range data signals using UHF radio waves according to a communication standard such as Bluetooth® or another communication standard that employs UHF waves, this requiring a communication module specific to this communication standard.

Such a communication module comprises a microprocessor and at least one first internal clock associated with a crystal oscillator for timing communications with outside the wheel unit, and advantageously an auxiliary clock for timing ancillary tasks such as waking up the microprocessor of the communication module.

It follows that the presence of a crystal oscillator associated with a clock integrated into the control module is no longer necessary for communication with outside the wheel unit but is for timing functions activated by the control module.

SUMMARY OF THE INVENTION

The problem addressed by an aspect of the present invention is, for a wheel unit comprising a control module and a communication module that employs ultra-high-frequency waves, that of removing from the control module a crystal oscillator that was essentially required for the radio-frequency communications of the wheel unit with outside that are no longer used, while maintaining a required accuracy of about 1% in a respective time base of the functions activated by the control module.

To this end, an aspect of the present invention relates to a method for controlling a trigger of an activation of at least one function performed by a control module housed in a wheel unit borne by a wheel associated with a motor vehicle, the control module measuring at least one parameter of the associated wheel and communicating, via a communication module, housed in the wheel unit, allowing the two-way exchange of short-range data signals using ultra-high-frequency radio waves, according to a communication standard for example such as Bluetooth®, with at least one remote device for monitoring and/or controlling the wheel unit, the communication module comprising a first microprocessor and at least one first internal clock associated with a crystal oscillator for error compensation and the control module comprising a second microprocessor and at least one second internal clock, requests to activate at least one function to be performed at a predetermined time by the control module being transmitted to the control module via the communication module, noteworthy in that, when an activation is required, a first time count ensuring a trigger of the activation of said at least one function at the predetermined time is started in the communication module by said at least one first internal clock associated with a crystal oscillator, a request to activate said at least one function being transmitted from the communication module to the control module which, upon receipt of the request to activate, is reconfigured in order to activate said at least one function at the predetermined time, an end of the time count in the communication module being transmitted to the control module, in order for the trigger of the activation to occur at the predetermined time.

By short-range, what is meant is over distances that may range from 0 to 100 meters. An aspect of the present invention is not limited to the Bluetooth® communication standard, and may use any communication standard that employs ultra-high-frequency waves.

By function, what is meant is a periodic or aperiodic activity carried out by the wheel unit via internal programming or on demand by a monitoring and/or control device located outside the wheel unit. Non-limitingly, mention may be made of:

a periodicity of scrutiny of physical data,
waking up the microprocessor,
acquiring physical data, such as the pressure of the tire, its temperature, its tension, acceleration for locating the wheel unit or for estimating a tire state such as load or wear or else a characteristic of the condition of the road,
monitoring the precision of the internal clock or clocks of the control module, which are not associated with a crystal oscillator and, where applicable, performing compensation thereof.

An aspect of the present invention runs contrary to the prejudice that, in the case where radiofrequency communication is replaced by communication using UHF radio waves according to a communication standard such as Bluetooth®, the presence of a crystal oscillator associated with a clock in the control module, and formerly present primarily to calibrate and/or readjust a time base of radiofrequency communications, remains necessary to ensure a maximum precision of other clocks of the control module.

The inventive step of an aspect of the present invention is to delegate the calibration of the time base of a function to be activated to a crystal-oscillator clock with which the ultra-high-frequency communication module is already equipped.

The main advantage of the method according to an aspect of the invention is to decrease the cost of a wheel unit by removing a crystal oscillator from the control module while maintaining a satisfactory precision in the activations and the periodicities of the functions performed by the control module of the wheel unit.

A crystal-oscillator clock with which the communication module is equipped for the sake of ultra-high-frequency communication may thus also be used for the activation of functions in the control module, this giving it a dual role in the wheel unit and representing an internal simplification of the wheel unit, thus decreasing its manufacturing cost.

Advantageously, said at least one function is selected from each or a combination of an acquisition of acceleration of the wheel associated with the wheel unit, a pressure of the wheel associated with the wheel unit, a temperature of the wheel associated with the wheel unit, an estimate of a state of the tire of the wheel associated with the wheel unit such as load or wear or else a characteristic of the condition of the road.

The acquisition of acceleration allows the wheel associated with the wheel unit to be located. Specifically, it is necessary to be able to associate, with each signal received by the remotely located monitoring and/or control device, information on the location on the motor vehicle of the wheel unit, and therefore on the wheel from which this signal originated, this requirement remaining in place throughout the lifetime of the vehicle, i.e. having to be met even after changes of wheels or more simply inversions of the position of these wheels.

Advantageously, said at least one function is a correction of said at least one second clock of the control module, a second time count being performed by said at least one second clock in the control module after receipt of a request to activate sent by the communication module to the control module until the predetermined time for the trigger of the activation, the communication module sending to the control module a second-count stop pulse at the predetermined time, the first and second time counts then being compared in the control module and, in the event of a difference between the first and second counts, the control module determines a correction coefficient for the second count and therefore for said at least one second clock.

The use of two time counts carried out in parallel in the control module by the crystal-oscillator clock, called the first clock, and by a clock without a crystal oscillator in the control module, called the second clock, makes it possible to periodically recalibrate the second clock, which would otherwise lose its precision, the first count by the crystal-oscillator clock of the communication module being the most precise.

Advantageously, the communications between the communication module and the control module take place via synchronous or asynchronous serial signals and/or via change of state of a port.

Advantageously, the communications via synchronous or asynchronous serial signals are two-way.

Advantageously, the communication module first sends a request to activate at least one function to the control module, the control module preparing itself, after receipt of the request to activate, to trigger the activation of said at least one function at the predetermined time, the communication module then sending a wake-up first pulse to the control module followed by an activation-trigger second pulse at the end of the first count, the control module activating said at least one function upon receipt of the second pulse at the predetermined time.

The request to activate contains activation data and is relatively data rich compared to two pulses. This gives the second microprocessor integrated into the control module time to prepare for activation. The receipt of the first pulse by the second microprocessor wakes it up and places it in a position to wait for the second pulse, the receipt of which automatically triggers the activation of the function at the predetermined time of activation. Without a prior request to activate and a first pulse, the second microprocessor would be unable to activate the function as soon as it receives the second pulse, preparation time being required thereby.

Advantageously, predetermined durations are defined between the request to activate and the first and second pulses, respectively.

Advantageously, the request to activate said at least one function takes the form of a synchronous or asynchronous serial signal. A synchronous or asynchronous serial signal lends itself to the transmission of a signal containing activation data.

Advantageously, the first and second pulses are transmitted by changing port between the communication module and the control module. The transmission by change of port is automatic and makes it possible to synchronize the trigger of activation of the function in the control module with the end of the time count in the communication module.

An aspect of the invention also relates to a wheel unit for a motor vehicle wheel, the wheel unit comprising, on the one hand, a communication module comprising a first microprocessor, at least one first internal clock associated with a crystal oscillator for an error compensation and means for exchanging two-way short-range data signals using ultra-high-frequency radio waves, according to a communication standard for example such as Bluetooth®, with outside the wheel unit, and, on the other hand, a control module comprising a second microprocessor, interacting with means for measuring at least one parameter of the associated wheel and at least one second internal clock, the communication module comprising means for communicating with the control module with a view to activating at least one function in the control module comprising reconfiguring means allowing the control module to perform said at least one function, the wheel unit implementing such a control method, noteworthy in that, in the wheel unit, only the communication module, among the communication module and control module, comprises at least one crystal oscillator associated with said at least one first internal clock, a trigger of the activation of said at least one function in the control module being controlled by a time counter integrated into the communication module and driven by said at least one first clock associated with a crystal oscillator.

BRIEF DESCRIPTION OF THE FIGURES

Other features, aims and advantages of aspects of the present invention will become apparent on reading the detailed description that follows and on examining the appended drawings, which are given by way of non-limiting example, and in which.

DETAILED DESCRIPTION OF THE INVENTION

An aspect of the present invention relates to a method for controlling a trigger of an activation of at least one function performed by a control module housed in a wheel unit borne by an associated wheel in a motor vehicle and to a wheel unit for implementing the control method.

The interaction between wheel units and a central monitoring and/or control unit integrated into the motor vehicle will first be described with reference to FIG. 1, then the detail of a wheel unit will be described with reference to FIG. 2.

Figure 1:
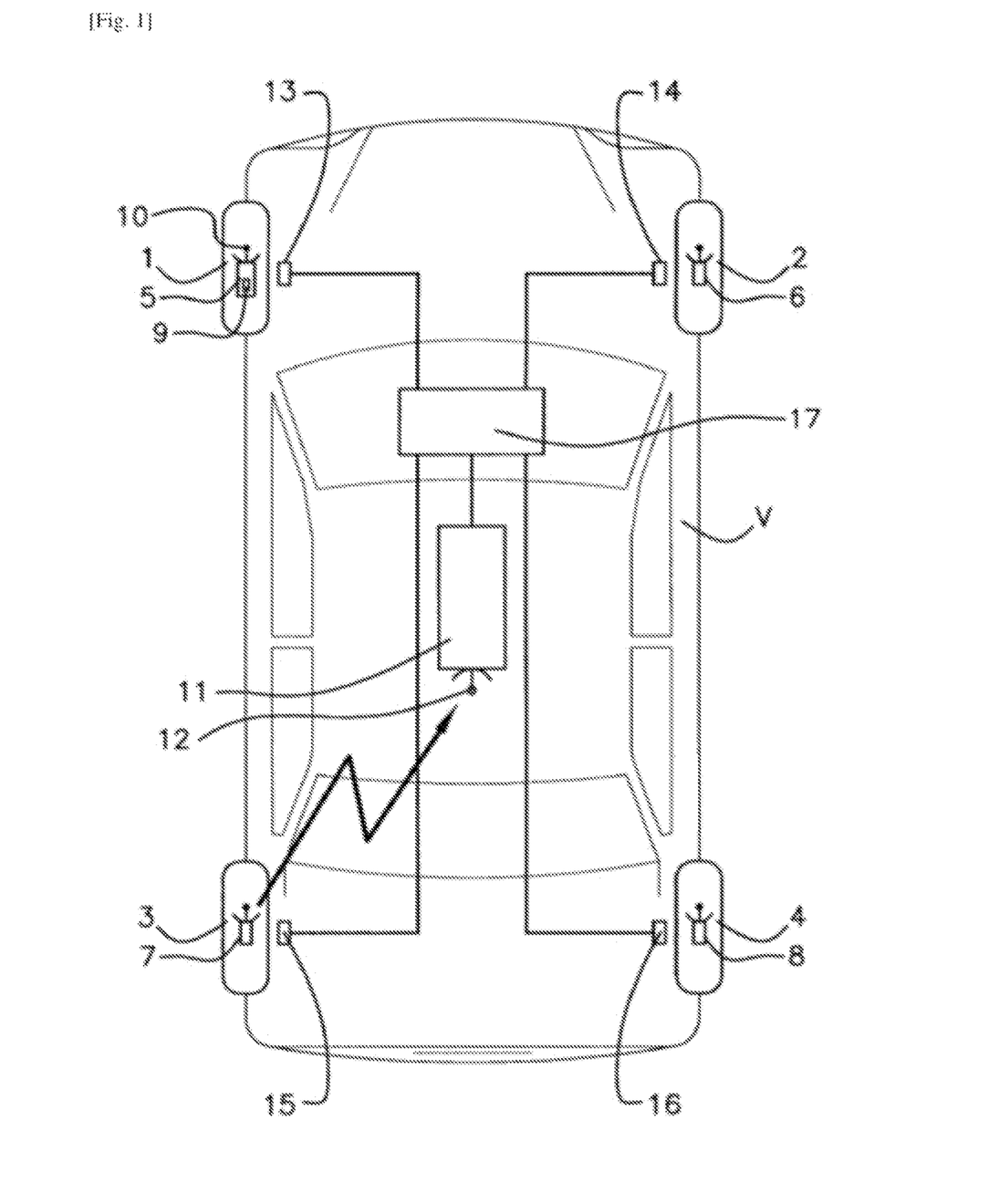
FIG. 1 is a schematic view from above of a vehicle equipped with one system for monitoring at least one tire parameter of a vehicle wheel per wheel unit, with wheel units and with a central monitoring and/or control unit that gathers the information sent by each wheel unit, the method for controlling a trigger of an activation of at least one function performed by a control module housed in a wheel unit according to an aspect of the invention being able to be implemented in such a system.

With reference more particularly to FIG. 1, but also with reference to the other figures as regards references missing from FIG. 1, a vehicle V equipped with four wheels 1-4 and equipped with a system for monitoring parameters, such as pressure, temperature, acceleration or an estimate of a state, such as load or wear, of the tire of the wheel, or else a characteristic of the condition of the road, is shown.

Whilst FIG. 1 shows a motor vehicle with four wheels, it should however be borne in mind that an aspect of the present invention may be applied to a motor vehicle V with more than four wheels, such as a truck for example.

Normally, the monitoring system conventionally comprises, first and foremost, a wheel unit 5 to 8 associated with each wheel 1 to 4, which wheel unit is for example secured to the rim of said wheel so as to be able to be positioned inside the casing of the tire. However, regarding anything related to load, wear or the condition of the road, the sensor of the wheel unit will no longer be located on the rim, but may be fastened to the tire, in the tread.

Each of these wheel units 5-8 incorporates sensors dedicated to measuring tire parameters and connected to a control module that is equipped with a microprocessor and linked to a transmitter 10 forming part of a communication module that is also equipped with a microprocessor, a single one of the transmitters having been referenced in FIG. 1. Each of these electronic wheel units 5-8 also incorporates, in a conventional manner, means 9 for measuring or estimating, for example but not necessarily, the angular position of the corresponding wheel unit 5 to 8, the measuring or estimating means being present, in FIG. 1, in a single wheel unit 5 but possibly being present in all the wheel units 5 to 8.

It is not possible to measure angle of rotation directly in the wheel units. In contrast, using measurement of radial acceleration, a set position may be detected.

In this non-limiting case, such measuring means 9 may advantageously consist of an accelerometer able to deliver modulated signals representative of values of gravity, and therefore of the angular position of the wheel unit, and the frequency of which is equal to the rotational frequency of the wheels, this making it possible to compute the rotational speed of said wheels.

The monitoring system also comprises a central unit 11 located in the vehicle V, comprising a microprocessor and incorporating a receiver 12 able to receive the signals transmitted by the transmitters 10 of each of the four wheel units 5-8.

The central unit 11 may be used as the remote monitoring and/or control unit, but this is not the only embodiment of the control unit, the control unit being able to be a cell phone, a tablet, a computer, an electronic watch, or a similar electronic device.

Although not essential in the context of an aspect of the present invention, an ABS system (ABS standing for anti-lock braking system) or an ESP system (ESP standing for electronic stability program) has been shown. Such a safety system comprises four wheel-speed sensors 13 to 16, which are positioned, in the vehicle V, each near to one wheel 1 to 4, and are designed to deliver, in the form of values convertible into angular values, data representative of the orientation of said wheel.

A module for monitoring/controlling the ABS system or the ESP system has been referenced 17. This is used to locate a wheel unit in the vehicle by comparing the signals sent by each wheel unit to the central device with the ABS or ESP signals delivered for each of the wheels.

In the system for monitoring parameters, such as the pressure or the temperature of the tires, comprising wheel units 5 to 8, a position of each wheel unit 5 to 8 in the vehicle V will have been previously identified and stored in the respective wheel unit 5 to 8.

The communication between each wheel unit 5 to 8 and said at least one monitoring and/or control device 11 takes place according to a communication standard, such as Bluetooth®, that allows two-way short-range exchange of data signals using ultra-high-frequency or UHF radio waves.

Electromagnetic fields are classified according to their frequencies. When microwaves or UHF radio waves, UHF meaning ultra-high frequency, are spoken of, what it is a question of are frequencies from 300 MHz to 300 GHz, most microwave sources emitting in the range of 900 to 2,600 MHz, or higher.

A low-energy Bluetooth® communication standard is advantageously used so as not to overburden the battery of the wheel unit 5 to 8, such a low-energy Bluetooth® communication standard being known by the name Bluetooth® BLE. An aspect of the present invention may however be applied to any signal with a carrier of 2.4 GHz or another ultra-high frequency.

This communication standard is very favorable to the set-up of a remote communication between each wheel unit and a cell phone or any other technical equivalent. However, another communication standard employing UHF or microwave waves may also be used.

Figure 2:
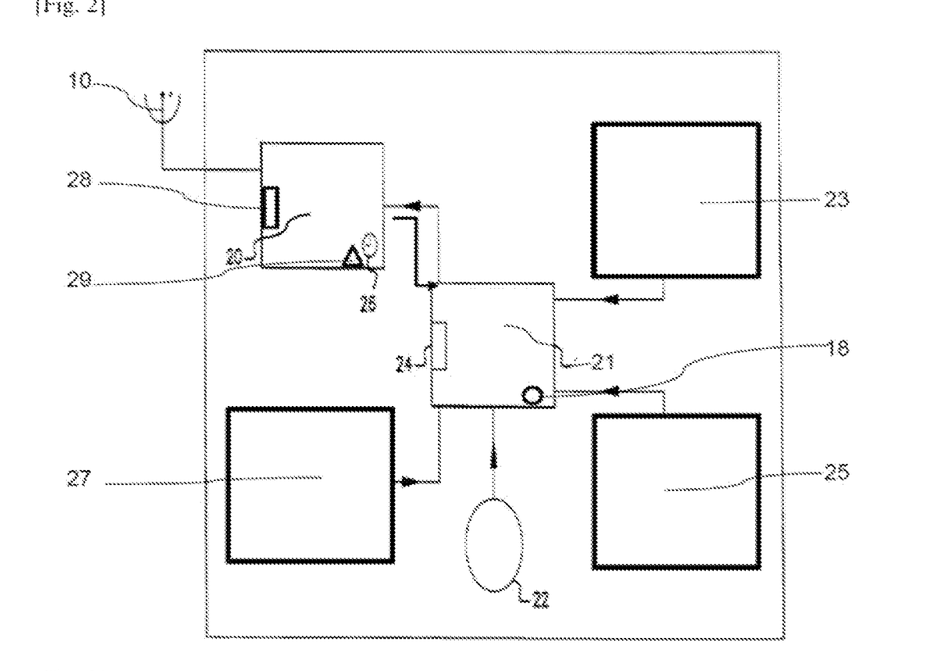
FIG. 2 is a schematic representation of a wheel unit comprising a module that employs UHF waves to communicate with outside the wheel unit and a control module that performs checking or monitoring functions in the wheel unit, the wheel unit implementing a control method according to an aspect of the present invention.

As will be seen with reference to FIG. 2, a wheel unit essentially comprises a communication module 20 allowing the two-way short-range exchange of data signals, using ultra-high-frequency or UHF radio waves according to a communication standard such as Bluetooth®, with at least one monitoring and/or control device located remotely from the wheel unit, which device may be the central unit, previously referenced 11 in FIG. 1. Each wheel unit in addition comprises a control module 21 that centralizes requests to activate functions to be performed by the wheel unit.

With reference to FIG. 2, an example of a wheel unit mounted in the valve of a vehicle tire comprises a control module 21 housed in the wheel unit borne by an associated wheel of a motor vehicle. The control module 21 commands the measurements of at least one parameter of the associated wheel, this being done by measuring means or measurement modules 23, 25 and 27 that will be described in more detail below. The number of measurement modules shown is non-limiting.

By way of non-limiting example, the control module may be an ASIC or application specific integrated circuit incorporating the measurement modules. Physically, only two modules may be seen, the UHF communication module and the control module incorporating all the sensors, such as sensors of acceleration, of pressure, of temperature or of voltage.

Incorporation of the measurement modules into the control module is an advantageous solution from the point of view of the cost of the product, but the contrary is also possible.

The control module 21 communicates with the UHF communication module 20 housed in the wheel unit. The communication module 20 comprises a first microprocessor 28 and at least one first internal clock 26 associated with a crystal oscillator 29 for an error compensation.

The control module 21, which is also referred to as the digital processing module, comprises a second microprocessor 24 and at least one second internal clock 18, as well as means for storing data, especially data delivered by the measurement modules 23, 25 and 27.

The denomination second microprocessor 24 is used to differentiate the microprocessor of the control module 21 from the first microprocessor 28 of the communication module 20, and not because there are two microprocessors in the control module 21; however, this would also be possible.

The control module 21 receives signals from the measurement modules 23, 25 and 27. The modules of the wheel unit, and in particular the communication module 20 and control module 21, are powered by a battery 22, advantageously a button cell, integrated into the wheel unit. This battery 22 powers all of the modules.

The communication module 20 ensures UHF communications with devices outside the wheel unit, in particular the central unit but also with mobile devices available to an authorized user such as a cell phone or technical equivalent having downloaded an application allowing it to communicate at UHF frequencies with the communication module 20 of each wheel unit.

Thus, requests to activate at least one function to be performed at a predetermined time by the control module 21 may be transmitted to the control module 21 by the communication module 20.

The communication module 20 receives beforehand these requests to activate (which are sent by the central unit integrated into the motor vehicle or the aforementioned mobile device) via two-way short-range exchange of data signals using UHF radio waves according to a communication standard such as Bluetooth®.

However, the communication between the communication module 20 and the control module 21 may be by wire or by change of port, between the first microprocessor 28 of the communication module 20 and the second microprocessor 24 of the control module 21.

The first clock 26, which employs a crystal oscillator 29, of the communication module 20 times with precision the UHF transmission to outside the wheel unit, and in particular the transmission of the values of the parameters recorded by the measurement modules 23, 25 and 27 and routed through the control module 21, and of an identifier of the tire of the wheel associated with the wheel unit.

Figure 3:
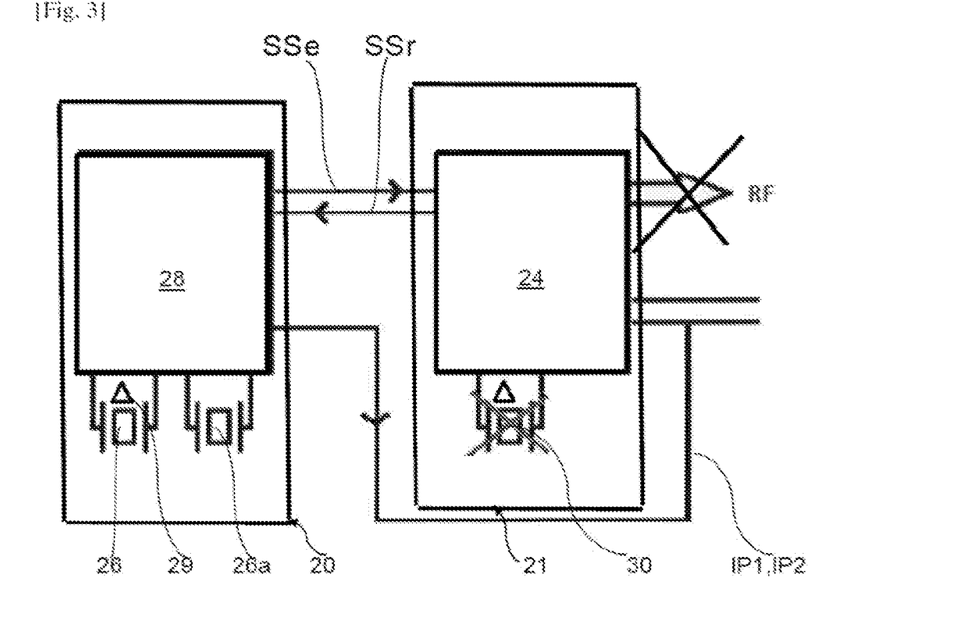
FIG. 3 is a schematic representation of the communication between an ultra-high-frequency communication module and a control module in a wheel unit according to an aspect of the present invention, the time base of activation of a function in the control module being set by a crystal-oscillator clock present in the communication module.

FIG. 3 shows the communication between the first microprocessor 28 of the communication module 20 and the second microprocessor 24 integrated into the control module 21.

The control module 21 was previously configured to communicate by radio-frequency RF with a central unit incorporated into the motor vehicle, this no longer being the case due to the presence of the UHF communication module 20, the reference symbolizing radio-frequency transmission RF consequently being crossed out in FIG. 3.

To achieve this RF transmission, the control module 21 would activate the measurement modules at a rate defined by a vibratory circuit. The measured values were kept in a memory of the control module 21, then transmitted by radio-frequency to the central unit.

For this radio-frequency transmission RF, in the control module 21, a crystal-oscillator clock 30, which is shown crossed out in FIG. 3 because the implementation of the method according to an aspect of the invention makes it superfluous, was used.

Specifically, this crystal-oscillator clock 30 in the control module 21 is no longer necessary for communication with outside the wheel unit, this communication with outside being dealt with by the UHF communication module 20, which possesses its own crystal-oscillator clock 26, i.e. a clock based on a crystal oscillator 29.

If no alternative means for controlling a time base were provided to replace it, the crystal-oscillator clock 30 in the control module 21 would still be necessary to correct drifts in the vibratory circuit affecting the measurements taken by the measurement modules 23, 25, 27, these drifts of the vibratory circuit previously being corrected via adjustment of the period of the circuit to that of the crystal oscillator of the crystal-oscillator clock 30, the vibration of which was highly regular.

Potentially however the control module 21 may retain at least one clock not associated with a crystal oscillator, called the second clock 18, in order to differentiate it from the first clock 26, which employs a crystal oscillator 29, of the communication module 20, this second clock 18, which is shown only in FIG. 2, not being precise enough to time and control a process of activation of at least one function in the control module 21.

As in FIG. 3, the communication module 20 may have two clocks, namely a first clock 26 associated with a crystal oscillator 29 and an auxiliary clock 26a. The first clock 26 associated with a crystal oscillator 29 and of high frequency, 16 MHz for example, is used to manage the time bases of the communication module 20. The auxiliary clock 26a is of low frequency, about 32 kHz for example, and is used for long-latency wake-ups.

An aspect of the present invention proposes that it be the first clock 26 associated with a crystal oscillator 29 of the communication module 20 that times the activation and trigger of at least one function performed by the control module 21, hence the ability to remove the crystal-oscillator clock 30 formerly present in the control module 20.

A request to activate may be sent by the central unit outside the wheel unit and transmitted by UHF radio waves according to a communication standard such as Bluetooth® so as to be received by the communication module 20.

A request to activate may originate from the control unit 21 itself. A change in the value measured by the measurement units may require a request to activate a function requiring a precise timing.

This request to activate may be unique or repeated periodically. This request to activate may have been stored in storage means of the communication module 20.

Thus, when an activation of at least one function in the wheel unit is required, a first time count that ensures a trigger of the activation of said at least one function at the predetermined time is started in the communication module 20 by said at least one first internal clock 26 associated with a crystal oscillator 29.

A request to activate said at least one function is transmitted from the communication module 20 to the control module 21 so that, upon receipt of the request to activate, the control module 21 is reconfigured in order to be ready to activate said at least one function at the predetermined time.

An end of the time being counted in the communication module 20, and therefore the moment at which the predetermined time is reached, is transmitted to the control module 21, in order for the trigger of the activation to occur at the predetermined time.

With reference to FIGS. 1 and 2, said at least one function is selected from each or a combination of an acquisition of acceleration of the wheel associated with the wheel unit 5 to 8 in the measurement module 23 with a view to locating the wheel unit, a pressure of the wheel associated with the wheel unit 5 to 8 in the measurement module 25, a temperature of the wheel associated with the wheel unit 5 to 8, an estimate of a state of the tire of the wheel associated with the wheel unit 5 to 8 such as load or wear or else a characteristic of the condition of the road.

A plurality of different time counts may be started simultaneously in the communication module 20, these all being controlled by the first clock 26, which employs a crystal oscillator 29.

Another possible function, in addition to or instead of another of the aforementioned functions, may be a correction of at least one second clock 18 of the control module 21. This second clock 18 is not associated directly with a crystal oscillator, such a crystal oscillator having been removed from the control module 21.

A second time count is then carried out in parallel by said at least one second clock 18 in the control module 21, after receipt of a request to activate sent by the communication module 20 to the control module 21, until the predetermined time for the trigger of the activation.

The communication module 20 sends the control module 21 a count-stop second pulse when the predetermined time is reached. The first and second time counts may then be compared in the control module 21 by the second microprocessor 24 of the control module 21.

What has to be compared here is the number of clock ticks 18. The clock 26 times the start pip and the stop pip, which allows a precise time window to be generated with a view to estimating the number of "imprecise" clock ticks 18 that occurred in this length of time.

In the event of a difference between the first and second counts, the control module 21 determines a correction coefficient for the second count and therefore for said at least one second clock 18.

Optionally, in the event of a difference between the first and second counts thus stopped, a correction coefficient for the second count and therefore for the second clock 18 may be sent to the control module 21 by the communication module 20, this allowing the second clock 18 to be reset, but this is only optional.

Specifically, the main aim is not necessarily to send a correction coefficient. The primary aim is to store this correction coefficient in a memory of the control module 21, so that when the same module 21 subsequently needs to perform a precisely timed task, it will be able itself to correct the error of its clock 18 with the same coefficient, and thus carry out its actions with precision without needing to call upon the resource that is the clock 26 of the communication unit 20.

The most important thing is therefore for the control module 21 to know the timing error of its own clock 18, in order to be able to compensate therefor.

If it is the clock 26 that triggers the start and the end of the length of time, the count must therefore be carried out in the control module 21 using the clock 18, so as to measure its "time" with respect to the reference of the precise time of the clock 26. The request to activate may, for example, contain the datum of the precise time, which will be generated by the communication module 20 using its precise clock 26, which employs a crystal oscillator 29.

The control module 21, which will start in parallel its relatively imprecise clock 18, will thus be able to count the number of clock ticks of the latter and to compare it to a perfect case, because the control module 21 knows its theoretical clock frequency.

This may be done for other clocks without a crystal oscillator, when such are present in the control module 21.

Figure 4:
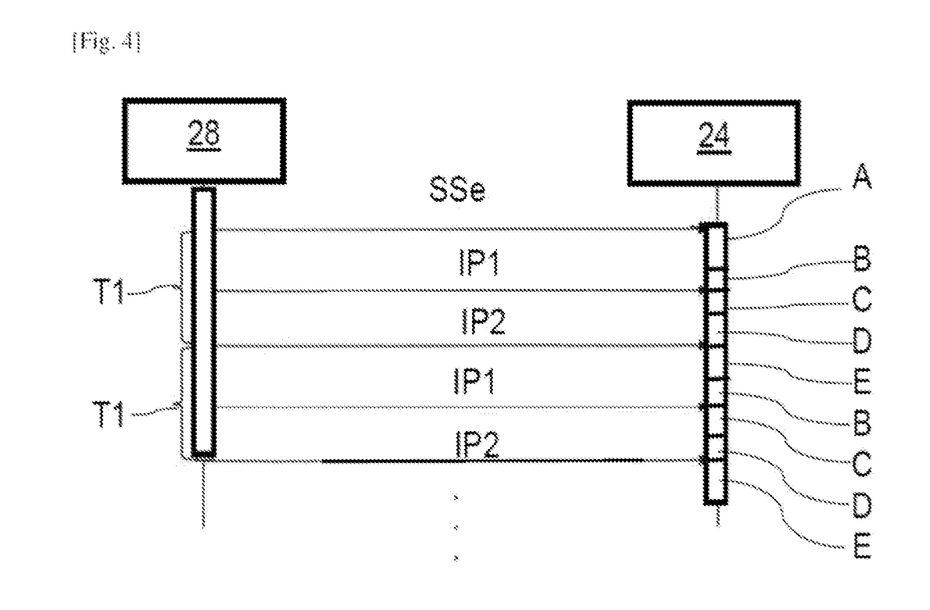
FIG. 4 is a diagram of the exchanges between the first microprocessor of the communication module and the second microprocessor of the control module of a wheel unit with a view to activation of a function by the control module, the exchanges first taking the form of transmission of a synchronous or asynchronous signal comprising activation data, followed by first and second pulses, the second pulse triggering the start of the activation at a predetermined time.

Referring mainly to FIGS. 3 and 4, the communications between the communication module 20 and the control module 21 may occur via synchronous or asynchronous serial signals SSe, SSr and/or via change of state of a port.

The asynchronous serial signal may be of UART type (UART standing for universal asynchronous receiver-transmitter).

The synchronous serial signal may be of SPI type (SPI standing for serial peripheral interface) or I2C type (I2C standing for inter-integrated circuit).

In FIG. 3, the synchronous or asynchronous signals SSe transmitted by the communication module 20 to the control module 21 are differentiated from the synchronous or asynchronous signals SSr received by the communication module 20 and sent by the control module 21.

A synchronous SPI/I2C communication will use one wire to exchange data and one wire to generate a synchronization signal for synchronizing the two communicating modules. As shown in FIG. 3, the communications via synchronous or asynchronous serial signals SSe, SSr are two-way. These communications may advantageously be by wire.

FIG. 4, which is to be considered in combination with FIG. 2 regarding missing references, shows a preferred but non-limiting optional mode of carrying out a communication between the first microprocessor 28 of the communication module 20 and the second microprocessor 24 of the control module 21, the communication and control modules not being referenced in FIG. 4 but being so in FIG. 2.

In this preferred optional embodiment, the communication module 20 first sends a request to activate SSe at least one function to the control module 21. After having received the request to activate, the control module 21 prepares itself to trigger the activation of said at least one function at the predetermined time, this preparing step being referenced A.

This preparing step is followed by a step B of standing by in a first type of way, awaiting a second signal from the communication module 20.

The communication module 20 then sends to the control module 21 a first wake-up pulse IP1, which is therefore a very short signal. Next, in the second microprocessor 24, comes step C, which is an update of the data with a view to a complete preparation for the activation of said at least one function.

Step C is followed by the waiting step D, in which a second pulse IP2, called the activation trigger pulse, is awaited, step D possibly including the second microprocessor 24 standing by in a second type of way.

The first type of standby may last a plurality of seconds and therefore consume a lot of current if the sleep level is not the lowest possible. The second type of standby is merely a stoppage of, very high-consumption, execution, which serves the purposes of synchronization, this stoppage lasting only a few hundred microseconds.

The communication module 20 then sends, to the control module 21, a second wake-up pulse IP2, which is the pulse for triggering activation at the end of the first count (therefore when the predetermined time is reached).

The control module 21 activates said at least one function in step E, upon receipt of the second pulse IP2 at the predetermined time, this generally leading to acquisition of one or more measurement values delivered by one of the measurement modules and to filtering of the one or more acquired measurement values.

Next, in FIG. 4, purely by way of indication, as regards periodic activation of at least the same function, the operations via which the first microprocessor 28 sends to the second microprocessor 24 the first and second pulses IP1, IP2 are repeated for a new activation of said at least one function, causing the succession of steps B to E to be repeated in the second microprocessor 24 of the control module 21.

During this repetition, a request to activate SSe at least one function is not sent to the control module 21, the request to activate being implied by the repetition of the activation of said at least one function.

Predetermined durations may be defined between the request to activate and the first and second pulses IP1, IP2, respectively, as may a duration T1 corresponding to the duration of the time count, i.e. to the duration between the start of this count and the end of this count, which occurs at the predetermined time.

As may be seen particularly clearly in FIG. 3, the request to activate said at least one function takes the form of a synchronous or asynchronous serial signal SSe comprising, as regards an asynchronous signal, at least one signal-start bit and at least one signal-end bit flanking activation signal data specific to said at least one function to be activated.

Still with reference to FIG. 3, the first and second pulses IP1, IP2 are transmitted via change of port between the communication module 20 and the control module 21.

In fact, using a change of port is the most advantageous solution. Nevertheless, it is possible that the end count trigger may also be achieved in the form of a serial communication. It is possible that the transmission and reception of serial messages may cause delays and, therefore, serial communication is not the most advantageous solution, because it is less precise and requires compensation for these delays.

With reference to all the figures, an aspect of the invention also relates to a wheel unit 5 to 8 for a motor vehicle wheel, the wheel unit being such as described above in particular with regard to FIGS. 1 to 3.

The wheel unit 5 to 8 comprises a communication module 20 comprising a first microprocessor 28, at least one first internal clock 26 associated with a crystal oscillator 29 for error compensation and means 10 for two-way exchange of short-range data signals using UHF radio waves according to a communication standard such as Bluetooth® with outside the wheel unit 5 to 8, and in particular with a central unit 11.

The wheel unit 5 to 8 comprises a control module 20 comprising a second microprocessor 24, which interacts with means 23, 25, 27 for measuring at least one parameter of the associated wheel, and at least one second internal clock 18.

The communication module 20 comprises means for communicating with the control module 21, with a view to activating at least one function in the control module 21 comprising reconfiguring means allowing the control module 21 to perform said at least one function.

Such a wheel unit 5 to 8 implements a method for controlling a trigger of an activation of at least one function performed by a control module 21 such as described above.

In the wheel unit 5 to 8, only the communication module 20, among the communication module 20 and control module 21, comprises at least one crystal oscillator 29 associated with said at least one first internal clock 26. As a result, an aspect of the present invention makes it possible to remove the high-precision crystal-oscillator clock 30 from the control module 21, i.e. the clock with which corresponding control modules employing radio frequency (RF) to communicate with the exterior of the wheel unit 5 to 8, and in particular with the central unit 11, were fitted.

A trigger of the activation of said at least one function in the control module 21 is then controlled via a time counter integrated in the communication module 20 and driven by said at least one first clock 26 associated with a crystal oscillator 29.

The invention claimed is:

1. A method for controlling a trigger of an activation of at least one function performed by a control module housed in a wheel unit borne by a wheel associated with a motor vehicle, the control module measuring at least one parameter of the associated wheel and communicating, via a communication module, housed in the wheel unit, allowing the two-way exchange of short-range data signals using ultra-high-frequency radio waves, with at least one remote device for monitoring and/or controlling the wheel unit, the communication module comprising a first microprocessor and at least one first internal clock associated with a crystal oscillator for error compensation and the control module comprising a second microprocessor and at least one second internal clock, requests to activate at least one function to be performed at a predetermined time by the control module being transmitted to the control module via the communication module, wherein, when an activation is required, a first time count ensuring a trigger of the activation of said at least one function at the predetermined time is started in the communication module by said at least one first internal clock associated with a crystal oscillator, a request to activate said at least one function being transmitted from the communication module to the control module which, upon receipt of the request to activate, is reconfigured in order to activate said at least one function at the predetermined time, an end of the time count in the communication module being transmitted to the control module, in order for the trigger of the activation to occur at the predetermined time.

2. The method as claimed in claim 1, wherein said at least one function is selected from each or a combination of an acquisition of acceleration of the wheel associated with the wheel unit, a pressure of the wheel associated with the wheel unit, a temperature of the wheel associated with the wheel unit, an estimate of a state of the tire of the wheel associated with the wheel unit such as load or wear or else a characteristic of the condition of the road.

3. The method as claimed in claim 2, wherein said at least one function is a correction of said at least one second clock of the control module, a second time count being performed by said at least one second clock in the control module after receipt of a request to activate sent by the communication module to the control module until the predetermined time for the trigger of the activation, the communication module sending to the control module a second-count stop pulse at the predetermined time, the first and second time counts then being compared in the control module and, in the event of a difference between the first and second counts, the control module determines a correction coefficient for the second count and therefore for said at least one second clock.

4. The method as claimed in claim 1, wherein the communications between the communication module and the control module are achieved via synchronous or asynchronous serial signals and/or via change of state of a port.

5. The method as claimed in claim 4, wherein the communications via synchronous or asynchronous serial signals are two-way.

6. The method as claimed in claim 4, wherein the communication module first sends a request to activate at least one function to the control module, the control module preparing itself, after receipt of the request to activate, to trigger the activation of said at least one function at the predetermined time, the communication module then sending a wake-up first pulse to the control module followed by an activation-trigger second pulse at the end of the first count, the control module activating said at least one function upon receipt of the second pulse at the predetermined time.

7. The method as claimed in claim 6, wherein predetermined durations are defined between the request to activate and the first and second pulses, respectively.

8. The method as claimed in claim 6, wherein the request to activate said at least one function takes the form of a synchronous or asynchronous serial signal.

9. The method as claimed in claim 8, wherein the first and second pulses are transmitted via change of port between the communication module and the control module.

10. A wheel unit for a motor vehicle wheel, the wheel unit comprising, on the one hand, a communication module comprising a first microprocessor, at least one first internal clock associated with a crystal oscillator for an error compensation and means for exchanging two-way short-range data signals using ultra-high-frequency radio waves with outside the wheel unit, and, on the other hand, a control module comprising a second microprocessor, interacting with means for measuring at least one parameter of the associated wheel and at least one second internal clock, the communication module comprising means for communicating with the control module with a view to activating at least one function in the control module comprising reconfiguring means allowing the control module to perform said at least one function, the wheel unit implementing a method as claimed in claim 1, wherein, in the wheel unit, only the communication modules, among the communication module and control module, comprises at least one crystal oscillator associated with said at least one first internal clock, a trigger of the activation of said at least one function in the control module being controlled by a time counter integrated into the communication module and driven by said at least one first clock associated with a crystal oscillator.

11. The method as claimed in claim 5, wherein the communication module first sends a request to activate at least one function to the control module, the control module preparing itself, after receipt of the request to activate, to trigger the activation of said at least one function at the predetermined time, the communication module then sending a wake-up first pulse to the control module followed by an activation-trigger second pulse at the end of the first count, the control module activating said at least one function upon receipt of the second pulse at the predetermined time.

12. The method as claimed in claim 7, wherein the request to activate said at least one function takes the form of a synchronous or asynchronous serial signal.

* * * * *

UNITED STATES PATENT AND TRADEMARK OFFICE
CERTIFICATE OF CORRECTION

| | |
|---|---|
| PATENT NO. | : 11,383,563 B2 |
| APPLICATION NO. | : 17/441486 |
| DATED | : July 12, 2022 |
| INVENTOR(S) | : Malard et al. |

Page 1 of 1

It is certified that error appears in the above-identified patent and that said Letters Patent is hereby corrected as shown below:

In the Claims

In Column 14, Line 44, "modules" should be -- module --.

Signed and Sealed this
Thirteenth Day of September, 2022

Katherine Kelly Vidal
*Director of the United States Patent and Trademark Office*